(12) United States Patent
Skolaude

(10) Patent No.: US 10,322,477 B2
(45) Date of Patent: Jun. 18, 2019

(54) FEED UNIT

(71) Applicant: RICHARD BERGNER VERBINDUNGSTECHNIK GMBH & CO. KG, Schwabach (DE)

(72) Inventor: Andreas Skolaude, Schwabach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 0 days.

(21) Appl. No.: 15/480,608

(22) Filed: Apr. 6, 2017

(65) Prior Publication Data

US 2017/0209966 A1 Jul. 27, 2017

Related U.S. Application Data

(63) Continuation of application No. PCT/EP2015/073051, filed on Oct. 6, 2015.

(30) Foreign Application Priority Data

Oct. 6, 2014 (DE) .................. 10 2014 220 194

(51) Int. Cl.
B23P 19/00 (2006.01)
B21J 15/32 (2006.01)

(52) U.S. Cl.
CPC ............. B23P 19/006 (2013.01); B21J 15/32 (2013.01)

(58) Field of Classification Search
CPC ................................ B23P 19/006; B21J 15/32
USPC ......................................................... 221/156
See application file for complete search history.

(56) References Cited

U.S. PATENT DOCUMENTS

| 2,843,166 | A | * | 7/1958 | Van Alstyne | ......... | B23P 19/006 |
| | | | | | | 81/435 |
| 3,114,477 | A | * | 12/1963 | Dixon | .................. | B23P 19/006 |
| | | | | | | 221/238 |
| 3,261,481 | A | * | 7/1966 | Laverty | ................. | B23P 19/006 |
| | | | | | | 221/224 |
| 4,113,142 | A | * | 9/1978 | Ryzhov | .................. | B65G 47/26 |
| | | | | | | 198/381 |

(Continued)

FOREIGN PATENT DOCUMENTS

DE 60016526 T2 4/2005
DE 10295718 B4 8/2006
(Continued)

*Primary Examiner* — Rakesh Kumar
(74) *Attorney, Agent, or Firm* — Laurence A. Greenberg; Werner H. Stemer; Ralph E. Locher

(57) ABSTRACT

A feed unit is used to feed connection elements from a receiving position to a transfer position along a feed direction. The feed unit has a receiving part to which each connection element can be fed individually. A head piece is movably mounted in the receiving part and has a receiving region for the nuts, and a thrust unit to move the head piece. The head piece is rotated from a first rotational position into a second rotational position, being reached in an intermediate position, by a rotary device. A slider element moves relative to the head piece out of the intermediate position into a transfer position within the head piece such that the nuts are brought out of the head piece into the transfer position. The rotary device has a mechanical forced guidance unit which includes a control sleeve with a curved path into which a control element engages.

16 Claims, 3 Drawing Sheets

(56) References Cited

U.S. PATENT DOCUMENTS

| | | | | |
|---|---|---|---|---|
| 4,352,440 A * | 10/1982 | Fukai | ............... | B65G 47/1485 198/396 |
| 4,463,889 A * | 8/1984 | Sartran | ............... | B25B 23/04 221/233 |
| 4,694,974 A * | 9/1987 | Heck | ............... | B23P 19/003 221/263 |
| 4,815,343 A * | 3/1989 | Sofinowski | ............... | B23P 19/006 81/431 |
| 4,953,749 A * | 9/1990 | Kubota | ............... | B65G 47/1407 221/168 |
| 5,044,519 A * | 9/1991 | Aoyama | ............... | B23P 19/006 221/212 |
| 5,172,467 A * | 12/1992 | Muller | ............... | B23P 19/062 29/716 |
| 5,248,058 A * | 9/1993 | Aoyama | ............... | B23P 19/006 221/165 |
| 5,291,645 A * | 3/1994 | Aoyama | ............... | B23P 19/006 29/240 |
| 5,359,171 A * | 10/1994 | Aoyama | ............... | B23K 9/206 219/93 |
| 5,392,954 A * | 2/1995 | Gartz | ............... | B21J 15/32 221/161 |
| 5,542,524 A * | 8/1996 | Sakoda | ............... | B23P 19/003 198/409 |
| 5,566,446 A * | 10/1996 | Luckhardt | ............... | B21J 15/32 227/120 |
| RE35,619 E * | 10/1997 | Muller | ............... | B23P 19/062 227/119 |
| 6,357,109 B1 | 3/2002 | Shinjo | | |
| 6,653,590 B1 * | 11/2003 | Aoyama | ............... | B23K 11/14 219/86.25 |
| 6,990,716 B2 * | 1/2006 | Weber | ............... | B21J 15/32 29/432 |
| 6,990,897 B2 * | 1/2006 | Gaskin | ............... | B23P 19/006 100/214 |
| 7,121,428 B2 * | 10/2006 | Hiramoto | ............... | B31B 70/00 221/210 |
| 7,559,136 B2 * | 7/2009 | Shinjo | ............... | B23P 19/062 29/243.518 |
| 8,636,186 B2 * | 1/2014 | Shinjo | ............... | B23P 19/006 227/118 |
| 9,604,327 B2 * | 3/2017 | Iwamoto | ............... | B23K 11/004 |
| 9,682,465 B2 * | 6/2017 | Lan | ............... | B25B 23/06 |
| 2011/0297724 A1 * | 12/2011 | Shinjo | ............... | B23P 19/006 227/119 |
| 2017/0209966 A1 * | 7/2017 | Skolaude | ............... | B23P 19/006 |

FOREIGN PATENT DOCUMENTS

| | | |
|---|---|---|
| DE | 102010024117 A1 | 12/2011 |
| EP | 1080826 A1 | 3/2001 |
| FR | 2796581 A1 | 1/2001 |
| JP | H02139133 A | 5/1990 |

\* cited by examiner

FEED UNIT

CROSS-REFERENCE TO RELATED APPLICATION

This is a continuation application, under 35 U.S.C. § 120, of copending international application No. PCT/EP2015/073051, filed Oct. 6, 2015, which designated the United States; this application also claims the priority, under 35 U.S.C. § 119, of German patent application No. DE 10 2014 220 194.2, filed Oct. 6, 2014; the prior applications are herewith incorporated by reference in their entirety.

BACKGROUND OF THE INVENTION

Field of the Invention

The invention relates to a feed unit for feeding connecting elements, in particular nuts, from a receiving position along a direction of feed to a delivery position, wherein the feed unit has a receiving part to which the connecting element can be fed.

A feed unit of this type can be seen, for instance, from German patent DE 102 95 718 B4, corresponding to U.S. Pat. No. 6,990,716. In automated processing machines, for instance for the automated insertion of connecting elements into work pieces, the connecting elements of the processing machine are frequently fed automatically. To this end, fundamentally different feed units, which must provide a respective connecting element respectively in correct positional arrangement at a defined delivery position, are known.

The processing machines are frequently constituted by presses or setting machines, with the aid of which a respective connecting element is pressed into the work piece. The connecting elements are constituted, for instance, by press-in elements such as press-in nuts or press-in bolts.

With a view to a process-reliable setting of such connecting elements, the feed unit needs to ensure that, for a respective work cycle, a connecting element is respectively available in correct positional arrangement at the delivery position. In many fields, for instance in the automotive industry sector, high clock rates are here too of great importance.

From German patent DE 102 95 718 B4 mentioned in the introduction, an apparatus for feeding connecting elements, in particular nuts, to a setting head of a press can be seen. The respective nut is here shot by compressed air and by a tube into a conveying section. This latter has a stowing section, on which a plurality of nuts is lined up. With the aid of a pushing unit, the individual connecting elements are pushed in the direction of the conveying section respectively into the delivery position.

SUMMARY OF THE INVENTION

Starting from the above, the object of the invention is to define a compact feed unit with which a high clock rate is possible.

The object is achieved according to the invention by a feed unit having the features of the main claim. The feed unit serves to feed connecting elements, in particular nuts, from a receiving position along a direction of feed to a delivery position of a processing machine, in particular a setting machine, for instance a press. The feed unit here contains a receiving part, to which a respective connecting element can be fed, preferably individually, by a feed mechanism, for instance by a stowing section or else by a tube. Within the receiving part, a head piece is displaceably mounted in the direction of feed. The head piece has a receiving region for the connecting element, into which the connecting element is inserted by the feed mechanism. This position defines the receiving position.

The feed unit further contains a pushing unit for displacing the head piece along the direction of feed up to an intermediate position within the receiving part. In this displacement, the connecting element is therefore conveyed with the head piece in the direction of feed. During this forward feed movement into the intermediate position, the head piece, and with this the receiving region, is at the same time twisted about the direction of feed, so that also the connecting element lying in the receiving region is thus twisted. A twist is here made into a desired orientation for the delivery position. The receiving region is thus twisted out of a first rotational position, which the receiving region assumes at the receiving position, into a second rotational position, which the receiving region assumes in the intermediate position. The feed unit additionally contains a slider element, which is coupled with the pushing unit. The slider element is guided in a relatively displaceable manner in the head piece. The slider element is shiftable out of the intermediate position up to the delivery position, within the head piece, in the direction of feed. During operation, a connecting element located in the receiving region is herein transported, in particular pushed, out of the head piece to the delivery position, whereby the connecting element is available for the actual setting operation.

As a result of the specific design for the transfer of the connecting element from the receiving position into the delivery position, in particular with the rotation of the connecting element, a compact construction is enabled insofar as the feed of the connecting element to the feed unit can be realized at an angle to, and in particular perpendicular to the direction of feed. Since the necessary rotation is realized in the forward feed movement, a high clock rate, moreover, is enabled.

With a view to a process-reliable design, the rotary device is formed by a mechanical positive guide. This preferredly has a control sleeve, on which the head piece is forcibly guided. The control sleeve is arranged in a rotationally secure manner.

To this end, the positive guide expediently has a predefined cam track, which, in the forward feed movement of the head piece, cooperates with a control element for the rotation of the head piece. The cam track can in this case also be constituted by a groove-like guide or else by a web. Conversely, the control element is constituted by an element complementary hereto, i.e., for instance, by a control pin, or else a recess. The cam track is here predefined by the control sleeve, that is to say a groove or a web is configured on the control sleeve. Along the cam track is guided the control element, which is connected in a rotationally secure manner to the head piece, so that a rotational movement of the head piece relative to the control sleeve, and thus also relative to the receiving part, is induced.

In a preferred embodiment, the head piece is resiliently mounted on the pushing unit. To this end, in particular a spring element is provided, which spring element is configured, for instance, as a compression spring and, in particular, as a helical spring. The resilient mounting of the head piece is in particular of advantage for the transfer of the connecting element from the intermediate position into the delivery position, since a relative displacement between the pushing unit and the head piece is herein realized.

In order to reliably enable this, the slider element is attached to the pushing unit. In the direction of feed, between the slider element and the pushing unit no relative displacement is enabled. Preferably, the slider element is additionally also arranged in a rotationally secure manner on the pushing unit. In the infeed movement, the slider element is therefore further displaced by the pushing unit relative to the head piece and here pushes the connecting element out of the receiving region of the head piece, so that the connecting element passes out of the head piece and is thus in the delivery position such that it is freely accessible for the processing machine. The delivery position is therefore generally already located within the processing machine, in particular the press.

Expediently, the head piece is resiliently pressed against a stop of the slider element, so that it is pressed into a basic position with respect to the relative displaceability to the slider element. Following transfer of the connecting element into the delivery position, the head piece is returned into this basic position. The basic position is thus constituted by a defined relative position between head piece and pushing unit, and thus also between head piece and slider element. This return movement is here realized in particular automatically with the aid of the spring element, against whose spring force the head piece is mounted on the pushing unit. The mechanical stop thus limits the adjustment travel of the head piece relative to the pushing unit or relative to the slider element.

In a preferred embodiment, the slider element and the head piece are guided relative to each other by a groove-pin guide. At the same time, in an expedient embodiment, the mechanical stop is formed by this guide. The pin thus butts against an end portion of the groove. Expediently, the groove is here configured in the slider element and the pin on the head piece. The pin is here preferably constituted by a bolt, which penetrates the groove and is arranged with its opposite end portions in the head piece and, in particular, is fastened there.

For the practicing of the rotational movement, the slider element is mounted, furthermore, in a rotationally secure manner in the head piece and, by the mechanical positive guide, the rotational movement is transmitted via the slider element to the head piece. The cam track provided by the control sleeve thus does not cooperate directly with the head piece, but indirectly via the slider element.

For the defined limitation of the forward feed travel and for the definition of the intermediate position, there is expediently provided, once the feed unit is fitted, a further mechanical stop, against which the head piece abuts when reaching the intermediate position. This stop is preferably formed by a component of the processing tool, to which the feed unit is fastened.

The receiving part is generally configured in the form of a sleeve, or else is of tubular configuration, i.e. has a central receiving space for the head piece. The receiving space is here in particular cylindrical to enable execution of the desired rotational movement of the head piece. For the intended feeding of the connecting elements into the receiving region, which shall be realized substantially in the radial direction, i.e. generally at an angle, and in particular roughly perpendicular to the direction of feed, the receiving part has a suitable lateral feed opening. To this feed opening, the aforementioned feed mechanism, i.e., for instance, a stowing section, etc. is connectable.

Within the head piece is generally configured a guide channel for the connecting element. A segment of this guide channel is formed by the receiving region, into which the connecting element, during operation, is inserted. The guide channel extends in the direction of feed and ends at the face end of the head piece, in order to be able to guide the connecting element back out of the head piece. The guide channel serves to guide the connecting element into the delivery position.

In order to fix the connecting element within the receiving region at a desired position, the head piece further has a clamping element, which thus exerts a clamping force on a respective connecting element lying in the receiving region. The clamping element hereupon presses the connecting element against a wall region of the receiving region, and thus of the guide channel. The clamping force is here oriented, in particular, perpendicular to the direction of feed and also perpendicular to a lead-in direction. The lead-in direction is here defined by the direction along which a respective connecting element is inserted into the receiving region.

Expediently, the clamping element already penetrates resiliently into the receiving region once there is no connecting element disposed in the receiving region. The clamping element thus penetrates into the free space, which is later occupied by the connecting element. The connecting element must therefore force the clamping element, against an elastic spring force, at least partially out of the receiving region. Hence, by the clamping element, a gentle braking of the connecting element is realized, whereby a damaging of the connecting element upon transfer into the receiving position is avoided.

Expediently, the clamping element is pivotably mounted on the head piece, so that it thus pivots into the receiving region.

With a view to a controlling of the entire work process, it is necessary that the presence of a connecting element is recognized. This is expediently realized with the aid of sensor element. This is preferably configured to register a movement of the clamping element.

In particular, the pivot movement of the clamping element is registered when this is pivoted against the spring force by a connecting element. The sensor element is constituted, in particular, by a distance or proximity sensor.

In the event of an appropriate sensor signal which thus indicates the presence of a connecting element, a respective work cycle is started. To this end, in particular the following work steps are provided: By means of the pushing unit, an in particular continuous shifting of the head piece is realized, starting from the receiving position in the direction of feed. After the intermediate position is reached, the connecting element lying in the receiving region is displaced into the delivery position by means of the slider element. After this, the pushing unit moves back again, wherein firstly the slider element moves back relative to the head piece, until head piece and slider element, back in their basic position, are oriented relative to each other. Subsequently the head piece and the slider element move jointly back into the starting position, so that a further connecting element can be inserted into the receiving region. Upon the displacement movement from the receiving position into the intermediate position and back again, the rotational movement of the head piece, in particular through 90°, is here respectively realized.

Other features which are considered as characteristic for the invention are set forth in the appended claims.

Although the invention is illustrated and described herein as embodied in a feed unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, like-acting parts are respectively provided with the same reference symbols.

Figure 1:
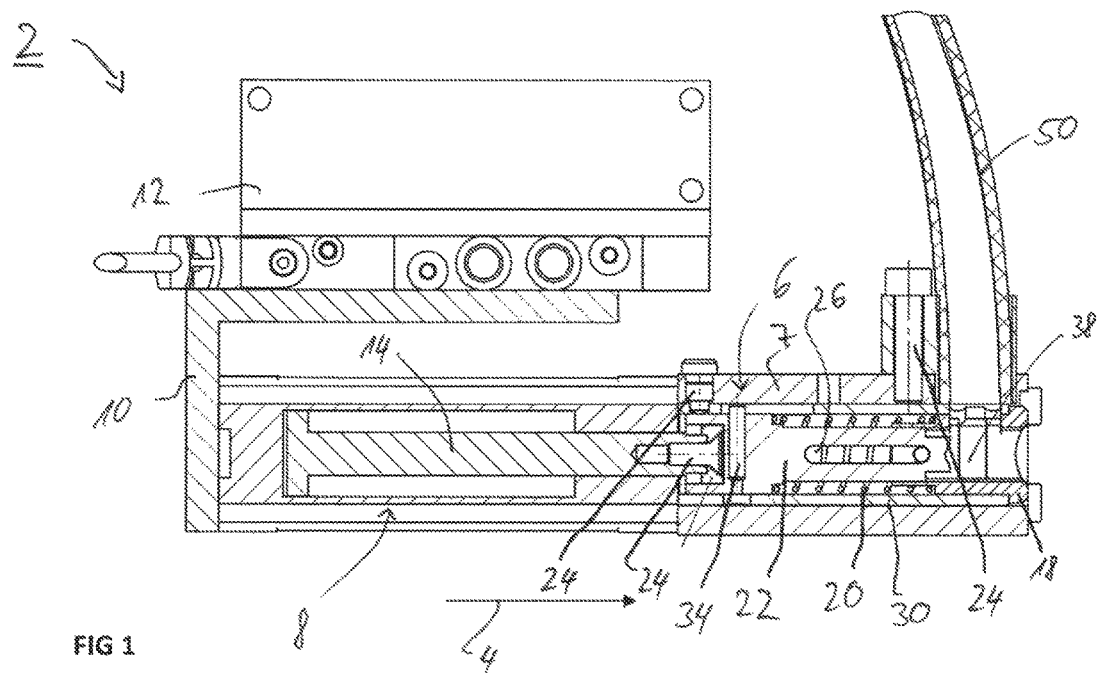
FIG. 1 is a diagrammatic, sectional view through a guide unit according to the invention.

Referring now to the figures of the drawings in detail and first, particularly to FIG. 1 thereof, there is shown a feed unit 2 which extends along a longitudinal direction or direction of feed 4. It has a front receiving part 6 and a rear pushing part 8. Via an, in the illustrative embodiment, bracket-like mounting 10 there is attached, furthermore, a control block 12, via which the individual movements and work cycles are controlled. The control block 12 here has suitable control valves. The controlling of the feed unit 2 is preferably realized pneumatically, or else hydraulically. In principle, an electromotive drive, for instance a servo direct drive, can also be provided.

Within the pushing part 8 is integrated a pushing unit 14, which, in particular, is configured as a pneumatic or hydraulic pushing unit 14 and, to this end, has a piston having a piston rod or push rod 16, which is displaceable within the pushing part in the direction of feed 4. To this end, the pushing part 8 has a piston chamber, in which the piston is displaceable. The piston chamber is delimited by a front and rear end wall. In particular, the front end wall here forms a stop for the displacement of the piston, and thus of the push rod 16, in the direction of feed 4.

The push rod 16 here reaches into the front receiving part 6. This has a tubular housing 7, which defines a cylindrical interior. Within the cylindrical interior, a head piece 18 is mounted in a slidingly displaceable manner. A forward feed movement of the pushing unit 14 is transmitted indirectly to the head piece 18. To this end, a spring element 20, configured, in particular, as a compression spring, is arranged, so that the pushing movement of the pushing unit 14 is transmitted via the spring element 20 to the head piece 18. In addition, in the illustrative embodiment there is interposed a slider element 22, which is fixedly connected to the pushing unit 14 and is fastened thereto. The slider element 22 has in the illustrative embodiment a foot region in the form of a collar, against which the spring element 20 is supported. The foot region is configured in the form of a sleeve, encompasses the push rod 16 and is connected thereto via a screw 24. In the direction of the pushing unit 14, the head piece 18 has a neck region of reduced diameter, so that on the head piece 18 too there is configured a collar, against which the spring element 20 is supported.

The slider element 22 has a front flat piece, which thus roughly has a rectangular cross section. Within this flat piece, the slider element 22 has a groove 26, within which a pin 28, configured as a bolt, is guided. The pin 28 is here mounted on both sides within the head piece 18.

The head piece 18 and the slider element 22 are in turn mounted within a control sleeve 30. This is arranged fixedly in the housing 7. The control sleeve 30 is here held on the housing 7 in a fixed and rotationally secure manner by screws 24. As is evident, in particular, from FIG. 4, the control sleeve 30 has a cam track 32, which is formed by a groove with suitable course. Into this cam track 32 reaches a control element 34 configured as a control pin. This is configured as a transverse bolt and, in the illustrative embodiment, is attached to the slider element 22, to be precise to rear foot region thereof. The control element 34, in a forward feed movement within the cam track 32, is therefore forcibly guided along the latter. The cam track 32 is here configured such that the slider element 22 is twisted around the direction of feed 4, to be precise in particular through 90°. By the control sleeve 30 in conjunction with the control element 34, a rotary device is therefore formed.

The transmission of the rotational movement of the slider element 22 to the head piece 18 is realized via the flat piece of the slider element 22. As a result, a rotationally secure connection to the head piece 18 is achieved. The head piece 18 thus has a guide channel 36 configured complementary to the flat region of the slider element 22.

Figure 3:
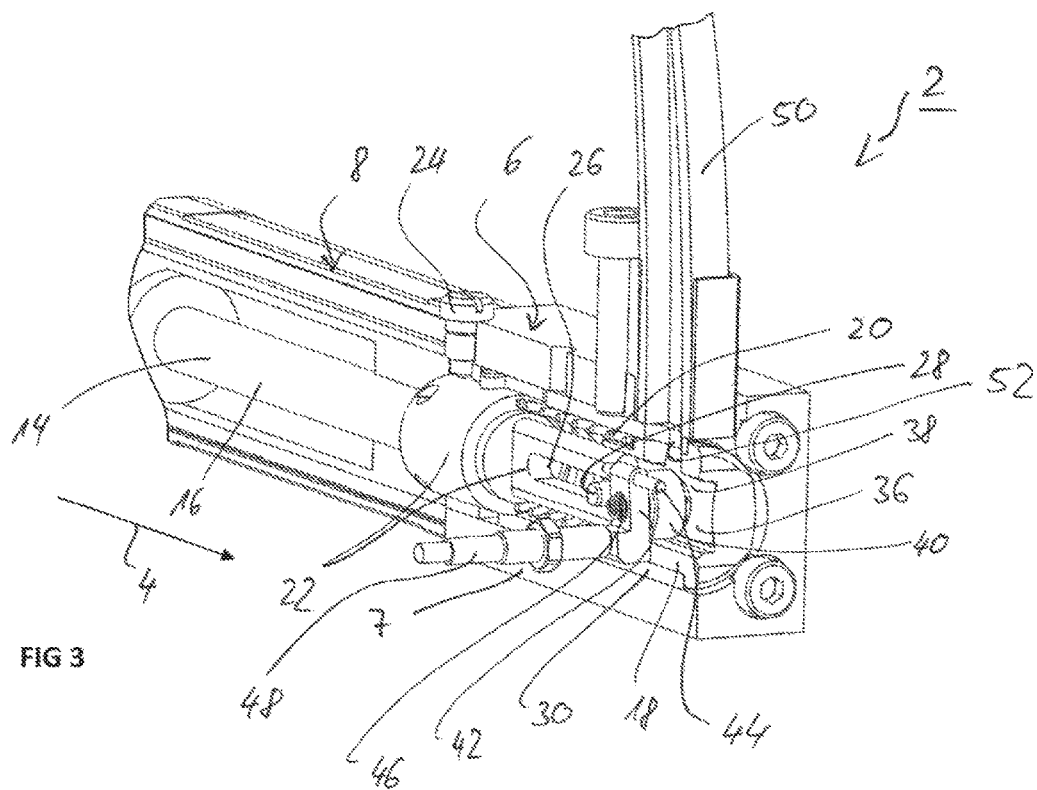
FIG. 3 is a perspective view comparable to FIG. 2, wherein a clamping element and a sensor element are additionally represented.

A segment of this guide channel 36 here defines a receiving region 38, into which is inserted a connecting element, in particular a nut 40. To the receiving region 38 is here assigned a clamping element 42, which is mounted on the head piece 18 so as to be pivotably movable about a pivot axis 44 counter to the spring force of a further spring element 46. The clamping element 42 is discernible in FIGS. 3 to 5, wherein, for greater clarity, the clamping element 42 and also a sensor element 48 are represented in free-floating arrangement, so to speak, without the associated segments of the head piece 18.

The further spring element 46 is supported in a recess of the head piece 18 and presses the clamping element 42 in the direction of the receiving region 38.

The sensor element 48 measures a distance to a measuring surface of the clamping element 42. The measuring surface is here configured, in particular, at the opposite end to the pivot axis 44.

To the side of the housing 7 of the receiving part 6 is fastened a feed mechanism 50, in the illustrative embodiment a feed tube. Via this, a respective nut 40 is inserted, in particular shot, into the receiving region 38 during operation. The fastening of the feed mechanism 50 is realized with a further screw 24. In the illustrative embodiment, this is screwed in place in the housing 7 and instantly clamps the control sleeve 30. This is secured in the rear region, to be precise in the region of the rear end of the slider element 22, additionally against twisting, by a further screw 24.

In order to enable a feed into the receiving region 38, both the housing and the control sleeve 30 and the head piece 18 have a respective feed opening 52, which feed openings form, so to speak, a feed channel for the respective nut 50 for feeding into the receiving region 38. This feed channel formed by the feed openings 52 here extends perpendicular, i.e. in the radial direction, to the direction of feed 4.

Figure 2:
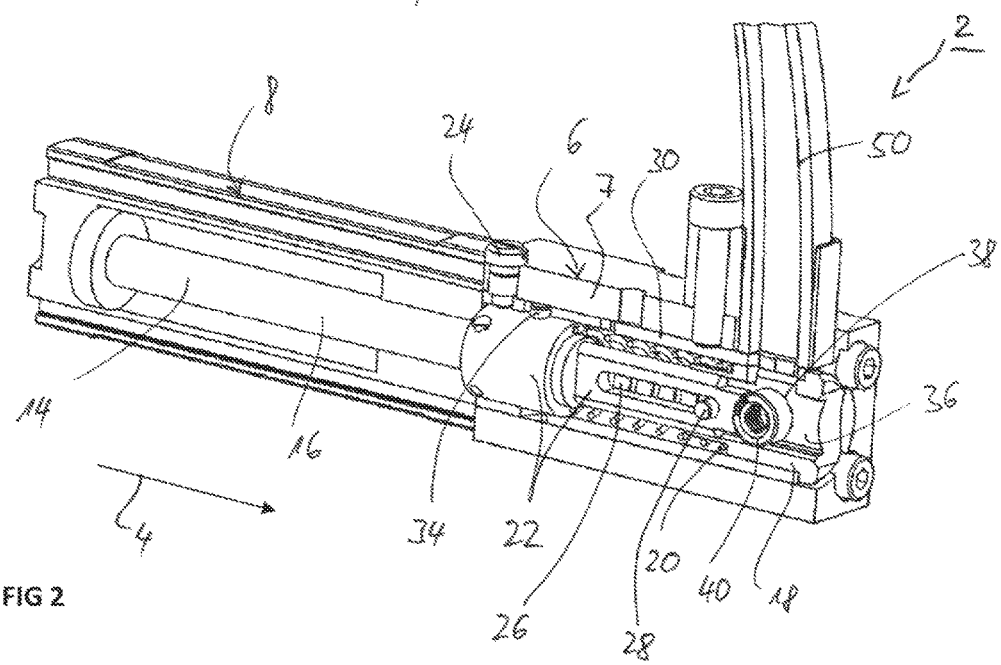
FIG. 2 is a perspective view in a form of a partial sectional view, in which a head piece is in a receiving position.

The operation of the feed unit is here as follows: In that starting position of the feed unit 2 which is represented in FIG. 2 and which at the same time defines a receiving position for the nut 40, a nut 40 is inserted via the feed mechanism 50 into the receiving region 38. The nut 40 hereupon forces the clamping element 42 pivoted into the receiving region 38 against the spring force of the further spring element 46. With this, the nut 40 is slowed down. At the same time, it is fixed by the clamping element 42 in the defined position within the flat channel 36 in the receiving region 38. The movement of the clamping element 42 is detected by the sensor element 48 and transmitted to a control unit (not represented in detail here).

The feed unit 2 is now ready for the execution of the work cycle. To this end, the pushing unit 14 is activated and shifted in the direction of feed 4. The controlling of the pushing unit 14 is realized with the aid of the control block 12 by the suitable actuation of appropriate valves. In the forward feed movement, the forward feed of the push rod 16 is transmitted by the slider element 22 and the first spring element 20 to the head piece 18. A relative displacement is in this case preferably not yet realized, that is to say a compression of the spring element 20 does not take place. The head piece 18 is therefore moved jointly with the slider element 22 synchronously in the direction of feed 4. Due to the positive guide formed by the control sleeve 30, a rotational movement of the head piece 18, and thus also of the receiving region 38, through 90° is realized, until the nut reaches an intermediate position. When the intermediate position is reached, the head piece 18 butts against a first stop 54 (see FIGS. 4 and 5). This is in particular formed by a component of the setting machine, in particular of the setting head.

Figure 5:
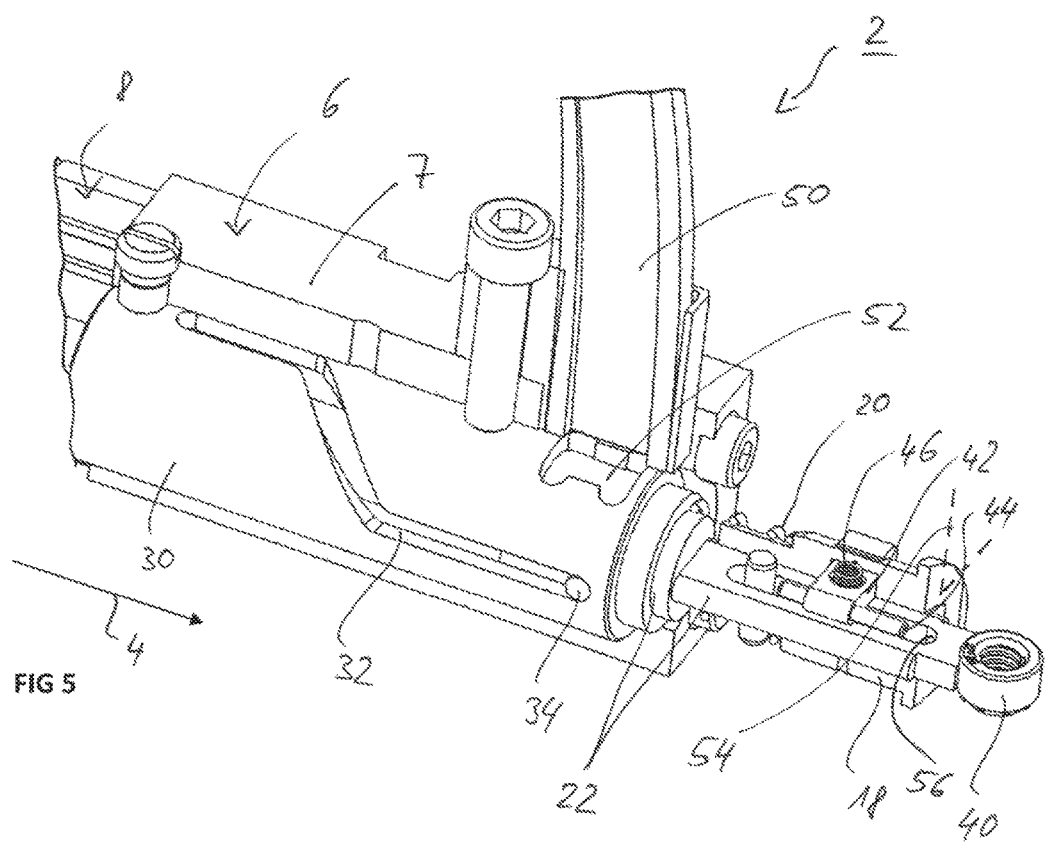
FIG. 5 is a partial perspective view comparable to FIG. 4, in which the connecting element is in a delivery position outside the head piece.

Starting from the intermediate position, the nut 40 is displaced in the direction of feed 4 into a delivery position represented in FIG. 5. The delivery position is already located within the actual setting head. To this end, the forward feed movement of the pushing unit 14 is continued, so that the slider element 22 is displaced further in the direction of feed 4. Since the head piece 18 is fixed by the first stop 54, a relative displacement of the slider element 22 to the head piece 18 is now realized, with compression of the first spring element 20. The nut 40 is therefore pressed forward out of the guide channel 36 of the head piece 18. FIG. 5 therefore shows the end setting in the delivery position.

Figure 4:
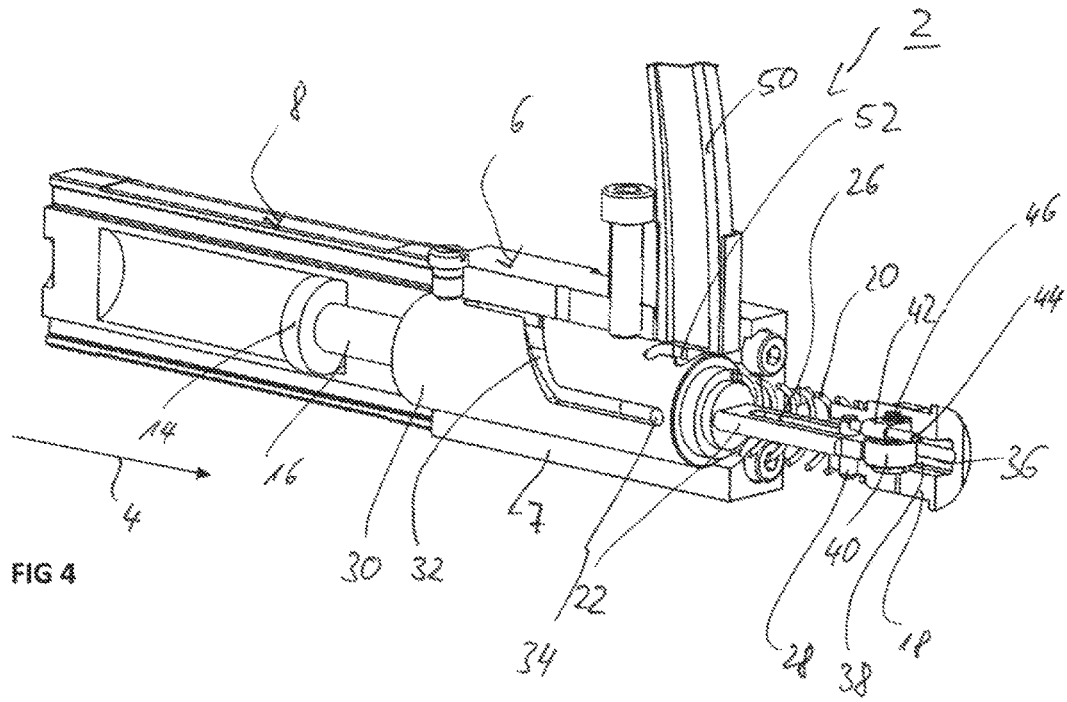
FIG. 4 is a further perspective view in a form of a partial sectional view, in which the head piece, after a 90° rotation, is in an intermediate position.

FIG. 4 likewise shows an end setting, yet a situation without stop 54. The representation of FIG. 4 is broadly similar to the intermediate position in which the head piece 18 is already turned. In the intermediate position, the push rod 16—represented differently than in FIG. 4—is still however in a middle position between the two settings, as can be seen from FIGS. 2, 3 and FIG. 4. From the intermediate position, the push rod 16 is still able to be displaced up to a stop in the direction of feed 4 into the end position represented in, for example, FIG. 4 or FIG. 5. This stop is here formed in particular by the front end wall of the piston chamber in which the push rod 16 is guided in a slidingly displaceable manner.

Following the delivery of the nut 40 to the delivery position, the forward feed unit moves back again counter to the direction of feed 4. The motional sequence is now in the reverse order: Firstly, the slider element 22 is led back relative to the head piece 18. The head piece 18 is therefore, furthermore, pressed against the stop 54 by the first spring element 20. As soon as the pin 28 within the groove 26 butts against the front end of the groove 26, the starting relative position (basic position) between the slider element 22 and the head piece 18 is reached. The front end of the groove 26 forms in this respect a second step 56. In this state, the intermediate position according to FIG. 4 is reached again. Subsequent to this, a synchronous restoring movement of the slider element 22 jointly with the head piece 18 is made. The back-rotation into the starting position is here realized again, as is represented in FIG. 1.

The work cycle then begins anew by insertion of a further nut 40.

The following is a summary list of reference numerals and the corresponding structure used in the above description of the invention:

| | |
|---|---|
| 2 | feed unit |
| 4 | direction of feed |
| 6 | receiving part |
| 7 | housing |
| 8 | pushing part |
| 10 | mounting |
| 12 | control block |
| 14 | pushing unit |
| 16 | push rod |
| 18 | head piece |
| 20 | first spring element |
| 22 | slider element |
| 24 | screw |
| 26 | groove |
| 28 | pin |
| 30 | control sleeve |
| 32 | cam track |
| 34 | control element |
| 36 | flat channel |
| 38 | receiving region |
| 40 | nut |
| 42 | clamping element |
| 44 | pivot axis |
| 46 | further spring element |
| 48 | sensor element |
| 50 | feed mechanism |
| 52 | feed opening |
| 54 | first stop |
| 56 | second stop |

The invention claimed is:

1. A feed unit for feeding connecting elements from a receiving position along a direction of feed to a delivery position, the feed unit comprising:
   a receiving part to which a connecting element can be fed;
   a head piece being displaceably mounted in said receiving part and having a receiving region for the connecting element;
   a pushing unit for displacing said head piece along the direction of feed up to an intermediate position;
   a rotary device configured to rotate said head piece during a forward feed movement of said head piece in the direction of feed, so that said receiving region is twisted about the direction of feed out of a first rotational position in the receiving position into a second rotational position in the intermediate position, the forward feed movement of the head piece being a linear movement; and
   a slider element coupled with said pushing unit and said slider element being shiftable out of the intermediate position up to the delivery position relative to said head piece in the direction of feed, so that the connecting element is transported out of said head piece to the delivery position.

2. The feed unit according to claim 1, wherein said rotary device forms a mechanical positive guide and has a control sleeve.

3. The feed unit according to claim 2, wherein said mechanical positive guide has a predefined cam track and a control element, said predefined cam track, in a forward feed movement, cooperates with said control element for a rotation of said head piece.

4. The feed unit according to claim 1, wherein said head piece is resiliently mounted on said pushing unit.

5. The feed unit according to claim 1, wherein said slider element is attached to said pushing unit.

6. The feed unit according to claim 1, wherein:
one of said pushing unit or said slider element has a mechanical stop; and
said head piece is resiliently pressed against said mechanical stop of said pushing unit or of said slider element.

7. The feed unit according to claim 1, further comprising a groove-pin guide, said slider element and said head piece are guided relative to each other by means of said groove-pin guide.

8. The feed unit according to claim 1, wherein said slider element is mounted in a rotationally secure manner on said head piece and, via said slider element, a rotational movement is transmissible to said head piece.

9. The feed unit according to claim 1, further comprising a further mechanical stop, and in a fitted state, the forward feed movement of said head piece is limited by said further mechanical stop.

10. The feed unit according to claim 1, wherein said receiving part has a feed opening formed therein and via said feed opening the connecting element can be inserted into said receiving region at an angle to the direction of feed.

11. The feed unit according to claim 1, wherein said head piece has a clamping element for a clamping fixation of the connecting element in said head piece.

12. The feed unit according to claim 11, wherein said clamping element penetrates resiliently into the receiving region.

13. The feed unit according to claim 1, wherein said receiving part has a feed opening formed therein and via said feed opening the connecting element can be inserted into said receiving region at an angle perpendicular to the direction of feed.

14. A feed unit for feeding connecting elements from a receiving position along a direction of feed to a delivery position, the feed unit comprising:
a receiving part to which a connecting element can be fed;
a head piece being displaceably mounted in said receiving part and having a receiving region for the connecting element, said head piece having a clamping element for a clamping fixation of the connecting element in said head piece, said clamping element being pivotably mounted on said head piece;
a pushing unit for displacing said head piece along the direction of feed up to an intermediate position;
a rotary device configured to rotate said head piece during a forward feed movement of said head piece in the direction of feed, so that said receiving region is twisted about the direction of feed out of a first rotational position in the receiving position into a second rotational position in the intermediate position; and
a slider element coupled with said pushing unit and said slider element being shiftable out of the intermediate position up to the delivery position relative to said head piece in the direction of feed, so that the connecting element is transported out of said head piece to the delivery position.

15. A feed unit for feeding connecting elements from a receiving position along a direction of feed to a delivery position, the feed unit comprising:
a receiving part to which a connecting element can be fed;
a head piece being displaceably mounted in said receiving part and having a receiving region for the connecting element, said head piece having a clamping element for a clamping fixation of the connecting element in said head piece;
a pushing unit for displacing said head piece along the direction of feed up to an intermediate position;
a rotary device configured to rotate said head piece during a forward feed movement of said head piece in the direction of feed, so that said receiving region is twisted about the direction of feed out of a first rotational position in the receiving position into a second rotational position in the intermediate position;
a slider element coupled with said pushing unit and said slider element being shiftable out of the intermediate position up to the delivery position relative to said head piece in the direction of feed, so that the connecting element is transported out of said head piece to the delivery position; and
a sensor element for registering a presence of the connecting element in the receiving region, wherein said sensor element is configured to register a movement of said clamping element.

16. A feed unit for feeding connecting elements from a receiving position along a direction of feed to a delivery position, the feed unit comprising:
a receiving part to which a connecting element can be fed;
a head piece being displaceably mounted in said receiving part and having a receiving region for the connecting element;
a pushing unit for displacing said head piece along the direction of feed up to an intermediate position;
a rotary device configured to rotate said head piece during a forward feed movement of said head piece in the direction of feed, so that said receiving region is twisted about the direction of feed out of a first rotational position in the receiving position into a second rotational position in the intermediate position, said rotary device forming a mechanical positive guide and having a control sleeve, said mechanical positive guide having a predefined cam track and a control element, said predefined cam track, in a forward feed movement, cooperating with said control element for a rotation of said head piece, said cam track being a groove, extending in the direction of feed, formed in said sleeve; and
a slider element coupled with said pushing unit and said slider element being shiftable out of the intermediate position up to the delivery position relative to said head piece in the direction of feed, so that the connecting element is transported out of said head piece to the delivery position.

* * * * *